US007697789B2

(12) United States Patent
McCandlish et al.

(10) Patent No.: US 7,697,789 B2
(45) Date of Patent: Apr. 13, 2010

(54) SYSTEM AND METHOD FOR ENHANCING STORED BINARY IMAGES

(75) Inventors: Peter McCandlish, Rochester, NY (US); Ramesh Nagarajan, Pittsford, NY (US); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1020 days.

(21) Appl. No.: 11/413,203

(22) Filed: Apr. 28, 2006

(65) Prior Publication Data
US 2007/0253631 A1    Nov. 1, 2007

(51) Int. Cl.
G06K 9/32    (2006.01)

(52) U.S. Cl. .................. 382/299; 382/164; 382/165; 382/274; 358/520

(58) Field of Classification Search .................. 382/274, 382/275, 299
See application file for complete search history.

(56) References Cited

U.S. PATENT DOCUMENTS

| 4,630,125 | A |   | 12/1986 | Roetling |            |
|-----------|---|---|---------|----------|------------|
| 5,296,909 | A | * | 3/1994  | Fazi et al. | 356/4.01 |
| 5,506,699 | A |   | 4/1996  | Wong     |            |
| 6,021,256 | A | * | 2/2000  | Ng et al. | 358/1.9   |
| 6,289,137 | B1| * | 9/2001  | Sugiyama et al. | 382/299 |
| 6,579,324 | B1| * | 6/2003  | Lowry et al. | 715/243 |
| 6,590,676 | B1|   | 7/2003  | Karidi   |            |
| 6,654,062 | B1| * | 11/2003 | Numata et al. | 348/362 |
| 6,690,424 | B1| * | 2/2004  | Hanagata et al. | 348/364 |

OTHER PUBLICATIONS

Fan, "Retrieval of Gray Images From Digital Halftones," *IEEE*, 1992, pp. 2477-2480.
Hein et al., "Reconstruction of Continuous Tone Images From Their Error-Diffused Halftone Version," *SPIE*, vol. 1913, 1993, pp. 310-324.
Kite et al., "A High Quality, Fast Inverse Halftoning Algorithm for Error Diffused Halftones," *Proceedings of the IEEE International Conference on Image Processing*, vol. 2, Oct. 4-7, 1998, pp. 59-63.
Miceli et al., "Inverse Halftoning," *Journal of Electronic Imaging*, vol. 1, No. 2, Apr. 1992, pp. 143-151.

\* cited by examiner

*Primary Examiner*—Yosef Kassa
(74) *Attorney, Agent, or Firm*—Pillsbury Winthrop Shaw Pittman LLP

(57)    ABSTRACT

A multifunction apparatus and method for enhancing store binary image data, is disclosed. The method includes retrieving the stored binary image data, converting the binary image data into higher-resolution image data, determining image enhancement processes, and applying the image enhancement processes to the higher-resolution image data to produce an enhanced image. The method further includes determining output format of the enhanced image and outputting the enhanced image.

18 Claims, 2 Drawing Sheets

SYSTEM AND METHOD FOR ENHANCING STORED BINARY IMAGES

BACKGROUND

1. Field

The present disclosure relates to digital document production equipment and, more specifically, to the enhancement of binary images stored in digital document production equipment.

2. Description of Related Art

Digital document production equipment is very common in today's office environment. Generally, such equipment, which includes printers, copiers, facsimiles, and other multifunction (MF) machines, is configured to capture text and images as digital image data and either reproduce the captured text and images on media based on the digital image data or format the digital image data in a manner suitable for transport across a network.

By way of example, consider the case of MF machines having digital copying capabilities, where original documents bearing images to be reproduced on paper sheets are typically loaded into the tray of a document handler. The documents are drawn one sheet at a time and moved relative to an image sensor that records reflected light from a series of small areas in the original image as the image moves past the sensor to yield a set of digital signals.

The digital signals are subsequently converted into binary image data. The binary image data is then compressed and stored in memory and, upon printing, the stored compressed binary image data is read out of memory, decompressed, and forwarded to an output device, such as, for example, an image output terminal (IOT) to print the scanned image on a sheet.

With regard to the quality of the reproduced image itself, some MF machines include user-selectable image enhancement options that are applied to the continuous tone image prior to binarization. Such continuous tone image formats are of higher resolution and typically comprise 8-bits (or higher) per pixel that represent greyscale or color images in the form of continuously varying tonal ranges. The user-selected enhancement options adjust image features and artifacts by manipulating and/or transforming the continuous tone image data. The enhanced continuous tone image data is then typically binarized and then supplied to the IOT. This results in an output image that has higher image quality and/or that has the user-selected image enhancement options applied to the input/scanned image.

More sophisticated MF machines offer a "store and retrieve" option, whereby stored image data may be later accessed and retrieved for future and different usage as originally intended. Upon selection of this option, the image data is stored in memory and may include the user-selected image enhancement options' information (i.e., image metadata). However, as a practical matter, because memory storage space remains at a premium and processing speed is an important factor, the image data is stored in the compressed binary image data format—rather than the continuous tone image formats. As a result, upon retrieval, new image adjustments and enhancements effected by the user-selectable options cannot be applied. Because binary image data is limited in its ability to accommodate image enhancements and improvements, the use of the "store and retrieve" feature becomes limited. For example it may force users to either re-copy the original image or settle for lower fidelity reproductions of the previously stored image.

SUMMARY

A system and method of enhancing binary image data are provided. In one embodiment, the method comprises retrieving the stored binary image data, converting the binary image data into higher-resolution image data, determining at least one image enhancement process, and applying the image enhancement process to the higher-resolution image data to produce an enhanced image. The method further includes determining output format of the enhanced image and outputting the enhanced image. The higher resolution image data may be of the continuous tone type.

Another embodiment includes an apparatus capable of enhancing stored binary image data. The apparatus includes an image processing system module configured to perform image data conversions and enhancements, a memory module configured to store binary image data and metadata indicative of image attributes, an image output terminal module configured to output an image, a network interface module configured to enable communications with a network, and a controller The controller module is configured to retrieve the stored binary image data from the memory module, initiate the conversion of the binary image data into higher-resolution image data by the image processing system, determine image enhancement processes, direct the image processing system to apply the image enhancement processes to the higher-resolution image data to produce an enhanced image, determine output format of the enhanced image, and output the enhanced image. The image may be output to an image output terminal module in the form of a printer for printing the image. Also, the image may be transmitted to a network via a network interface module or sent to a remote fax destination through a fax interface module.

This embodiment may also, as an alternative, include the application of image enhancement processing, with the use of the metadata, to be performed in the background at times when the system is not busy and the storing of the subsequently processed image back into an Electronic Precollation Memory for sending of the additionally enhanced image to the IOT at a later time of the users choosing. Thus, immediate output of the image to a functional module is not necessary, and it may be output to a memory awaiting use by a functional module.

Other objects, features, and advantages will become appreciated from the foregoing detailed description, the accompanying drawings, and the appended claims.

BRIEF DESCRIPTION OF DRAWINGS

The accompanying drawings, which are incorporated in and constitute a part of the present patent specification, depict corresponding embodiments of the invention, by way of example only, and it should be appreciated that corresponding reference symbols indicate corresponding parts. In the drawings.

DETAILED DESCRIPTION

Figure 1:
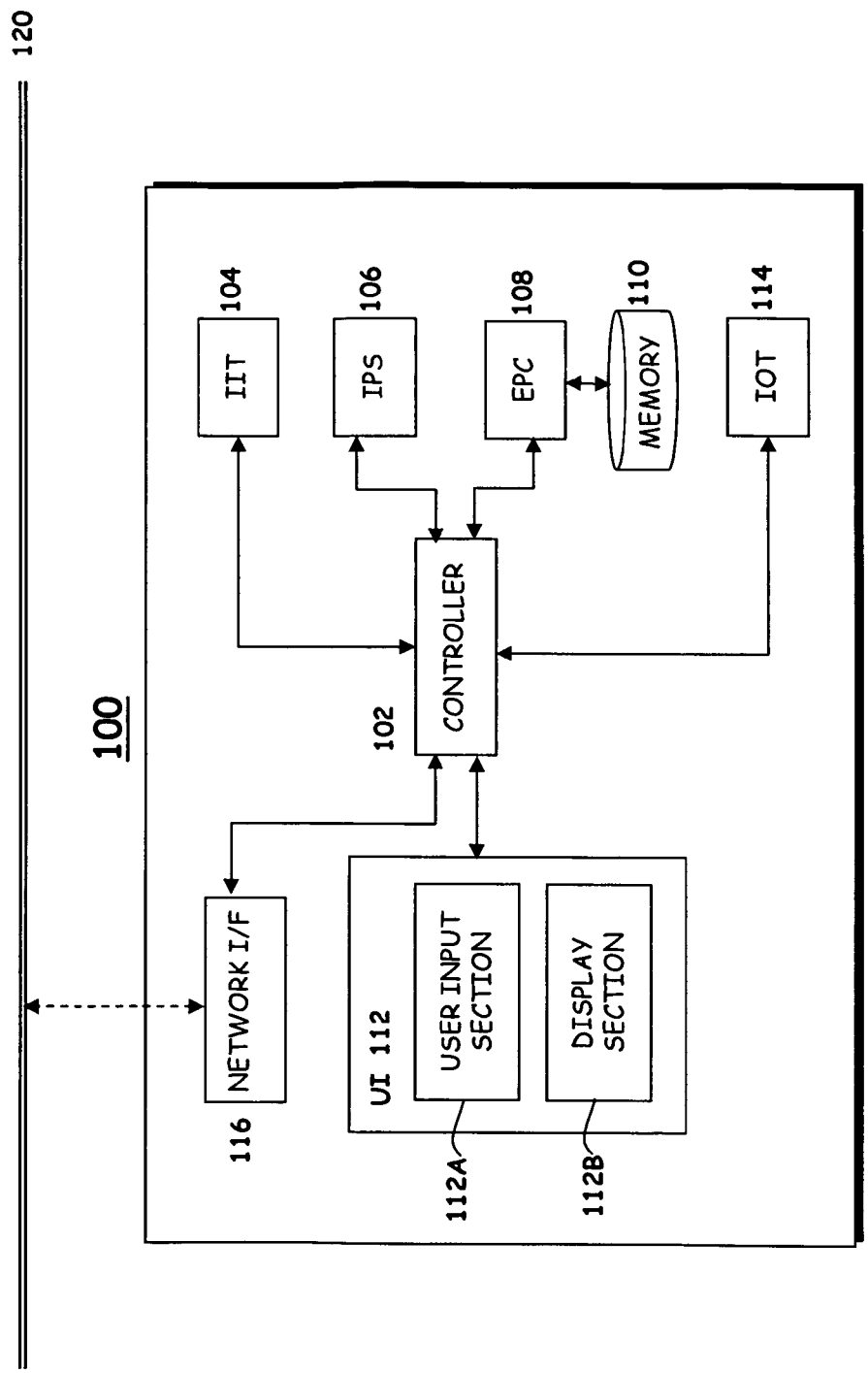
FIG. 1 depicts a block diagram associated with the principal digital copying features of a MF machine.

FIG. 1 depicts a block diagram associated with the principal digital copying features of a MF machine 100. Such an apparatus is intended to cover scanners, printers, copiers, facsimiles, or other multifunction machines that are capable of reproducing images and documents. Moreover the particular apparatus disclosed is merely an exemplary embodiment and, in no way, is it intended to be limiting.

As illustrated in FIG. 1, MF machine 100 comprises controller module 102, a user interface (UI) module 112, a network interface (I/F) module 116, an image input terminal (IIT) module 104, an image processing system (IPS) module 106, an electronic pre-collation system (EPC) module 108 with associated memory 110, and an image output terminal (IOT) module 110.

Controller module 102 is configured to manage and control the overall digital copier functionality of MF machine 100 as well coordinate communications and operations between the various modules. Controller 102 may, thus, comprise microprocessing circuitry, application-specific integrated circuitry (ASIC), or similar logic circuitry capable of processing information and instructions, responding to information requests, communicating with various associated modules, and executing commands. In so doing, controller 102 is configured to operate with executable instructions, such as software and/or firmware code, that effect the processes associated with the embodiments of the present invention.

To illustrate the interoperability of some of the various modules (e.g., image input terminal (IIT) module 104, image processing system (IPS) module 106, an electronic pre-collation system (EPC) module 108, memory 110, and image output terminal (IOT) module 110), consider that original documents bearing images to be reproduced are moved relative to image input terminal (IIT) 104 that optically reads or scans the original image. IIT 104 includes an image sensor that records reflected light from a series of small areas in the original image as the image moves past the sensor to yield a set of digital signals.

The digital signals are subsequently converted, by an image processing system (IPS) 106, into binary image data. It will be appreciated that the binary image data comprises lower resolution binary data formats. That is, for black and white images (such as black text on white background), the binary image data represents of the on/off state of white content in the image pixels and, therefore, has a 1-bit per pixel resolution. For color original images, the binary image data represents the on/off state of each of binary cyan, magenta, yellow, and black (CMYK) content of the image pixels. The IPS 106 may use any known technique for processing the image, including applying transfer curves, linear and non linear filters, or color transformation matrices or tables to the image. The IPS 106 then compresses the binary image data and stores the data in the memory 110 associated for example with electronic pre-collation system (EPC) 108.

EPC 108 is configured to store images and documents in electronic form and pre-collate the document pages. For typical copying tasks, the stored compressed binary image data is read out of EPC memory 110, decompressed, and forwarded to image output terminal (IOT) 114 to print the scanned image on a sheet. That is, the IOT 114 prints the image onto a sheet of paper or other substrate medium.

Returning to FIG. 1, UI module 112 is configured to enable users to enter operation commands, or the like, and includes a user input section 112A and display section 112B. The display section 112B may comprise a liquid crystal display (LCD), for example, while user input section 112A may comprise buttons. Moreover, both user input section 112A and display section 112B may comprise a touch panel. In accordance with embodiments of the present invention, user-selectable image enhancement options as well as store and retrieve options are communicated to controller module 102 via UI module 112.

Finally, network interface (I/F) module 116 is configured to communicate and transport information to and from network 120. That is, MF machine 100 may be coupled to network 120 for remotely accepting and performing printing tasks as well as being able to transport digital image data to a client across network 120.

Figure 2:
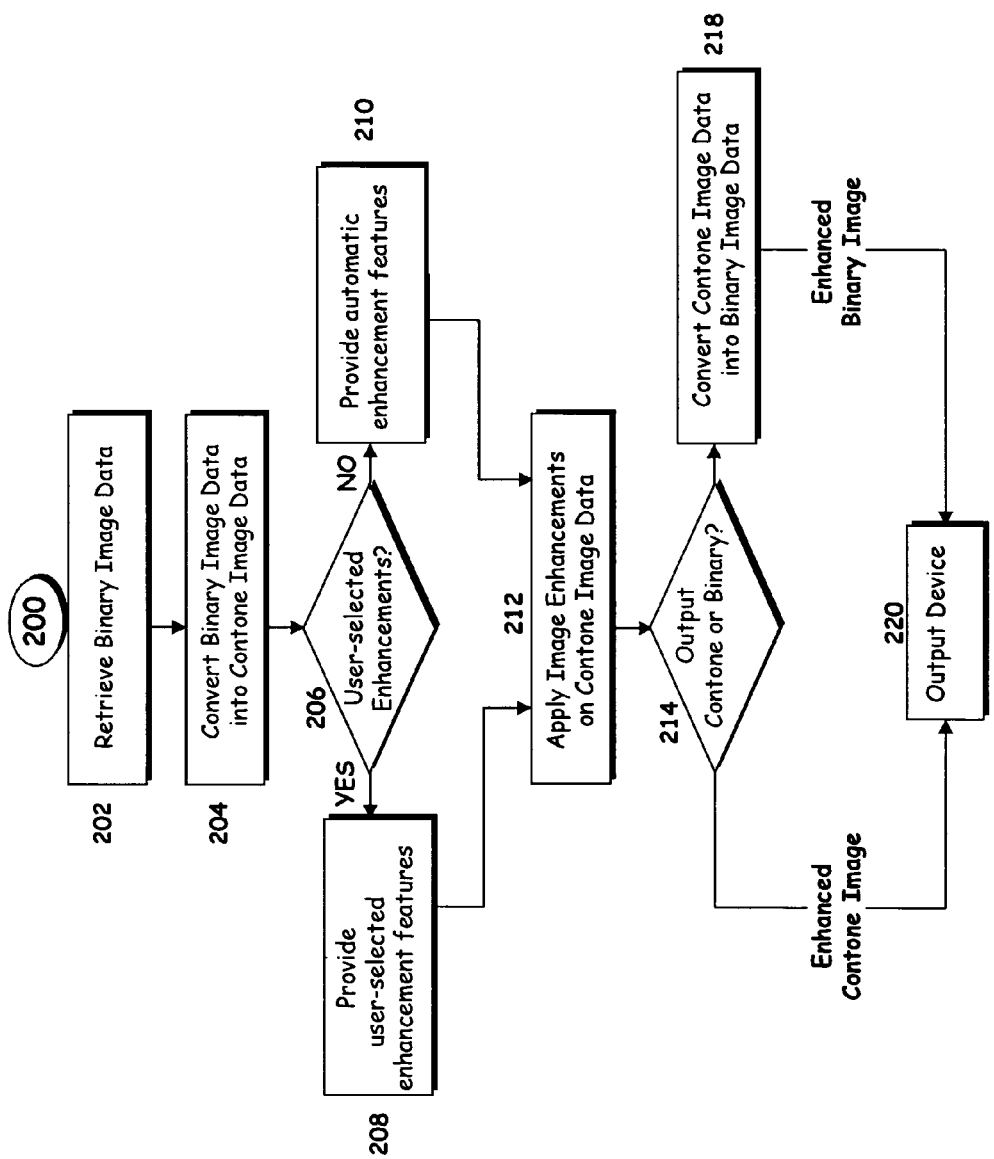
FIG. 2 depicts a system and method of applying image enhancement and image format manipulation options to binary image data.

FIG. 2 depicts process 200 directed to effect image enhancements of stored, compressed, binary image data, in accordance with embodiments of the present invention. For the sake of brevity, it is assumed that a prior copy task has been initiated and that the "store and retrieve" option for future reproductions has been selected by the user, via UI module 112, so that the original image has been scanned by IIT module 104 and the compressed binary image data has been stored in EPC memory 110.

As depicted in task 202, the retrieval option is selected, so that the binary image data is accessed, uncompressed, and retrieved from EPC memory 110 as well as image metadata. Image metadata may include attribute information, such as, copy settings, segmentation tag maps, as well as image processing parameters, such as prior image enhancement adjustment information. Metadata may be included as part of the image data so that when it is converted to continuous tone there is extra information to undo/do certain processing for the retrieval. For example, one part of the metadata information could be Original Type mode (Photo, Text, Mixed) that the user had selected while scanning. This apriori information could be used to apply suitable look up table in the contone restoration process. Other examples of such metadata for user-selected settings may include original sub-type, background suppression, contrast enhancement, dynamic range adjustment, brightness adjustment, sharpness adjustment, hue adjustment, chrome adjustment, color balance, and saturation adjustment. Also metadata could include data to direct further processing of the image (for example the background suppression) so that at a later time the user through the store and recall feature could select an image and the metadata would indicate that background suppression has been applied.

In task 204, the binary image data is converted to continuous tone image data. That is for black and white images, the binary image data may be converted from the 1-bit per pixel data to an 8-bit per pixel greyscale image data, while for color images, the binary 4 planes of 1-bit per pixel CMYK image data may be converted to 32-bit (i.e., 8 bits per color plane) per pixel color image data. Such a conversion, may include methods such as the one using look up tables as described in U.S. Pat. No. 6,343,159, the entirety of which is incorporated herein by reference. Alternatively such a conversion may include methods such as the one using a digital filtering approach described in patent application Ser. No. 11/126,970, the entirety of which is incorporated herein by reference.

In task 206, process 200 determines whether user-selectable image enhancement options have been selected, via UI 112, for the retrieved image. If so, the user-selected image enhancement information is identified, in task 208, and provided for processing to task 212. If user-selectable image enhancement options have not been selected, automatic enhancement features are identified, in task 210, and provided for processing to task 212. The automatic enhancement features may be based, for example, on the stored image metadata.

As noted above, image enhancement may involve adjusting image features and artifacts by manipulating and/or transforming the continuous tone image data. Whether user-selected or automatically-provided, image enhancement may include, for example, original type, original subtype, background suppression, contrast enhancement, dynamic range adjustment, brightness adjustment, sharpness adjustment, hue adjustment, chroma adjustment, color balance adjustment, and saturation adjustment. Such enhancement processes are known and need not be detailed herein. Image enhancement may involve adaptive dynamic range adjustment via methods described in the patent application Ser. No. 11/275,078, which is incorporated herein by reference.

In task 212, continuous tone image data is processed by applying the user-selected or automatically-provided image enhancement information. For color images, this may include color space conversions. That is, 32-bit per pixel color image data, which resulted from the CMYK conversion in task 204, may be transformed back to an improved version of the original color space (e.g., a device independent color space such as Lab or YCbCr color spaces). In particular, the image metadata may include attribute information regarding the conversion of the original color space to continuous tone CMYK. This metadata may then be retrieved from EPC memory 110 and exploited to perform an as accurate as possible reverse transform to achieve the original color space. The user-selected or automatically-provided image enhancement information may then be applied to the original color space, thereby rendering an enhanced, higher fidelity version of the image. The enhanced original color space image may then be converted back to continuous tone 32 bit per pixel CMYK for processing or left in the original color space or converted to a 24 bit per pixel standard color space such as RGB.

Based on user-selectable input, such as, for example, via UI 112, process 200 then determines, at task 214, whether the enhanced image data is to be outputted as an enhanced continuous tone image or as an enhanced binary image. If the enhanced continuous tone image output is selected, then the enhanced continuous tone image is forwarded to an output device in the appropriate color space, in task 220. The output device may include IOT 114, in which the enhanced continuous tone image is reproduced on a sheet. Alternatively, the enhanced continuous tone image may be exported to a network 120 file system or e-mailed to a recipient or sent to remote fax destination through the fax interface module, thereby allowing the "store and retrieve" feature to operate as a "scan-to-file" task.

If, in task 214, the enhanced binary image output is selected, the enhanced continuous tone image is converted, in task 218, as an enhanced binary image. That is, techniques, such as, error diffusion, dithering, and/or thresholding or any other type of halftoning are applied to the enhanced continuous tone image to generate the enhanced binary image. This task also enables previously stored color images to be translated into black and white images. The enhanced binary image is then forwarded to an output device, as described above, in task 220.

In this manner, a stored binary image may be enhanced and adjusted for future reproductions. Moreover, the elements of MF machine 100 may be configured to effect the process described above. In one embodiment, for example, controller module 102 may be modified with executable instructions and commands in conjunction with IPS module 106, EPC module 108, memory 110, and/or UI 112, to perform the above-identified process of enhancing stored binary images.

It will be appreciated that various of the above-disclosed and other features and functions, or alternatives thereof, may be desirably combined into many other different systems or applications. Also, various alternatives, modifications, variations or improvements are also intended to be encompassed by the following claims.

What is claimed is:

1. A method of enhancing stored binary image data, comprising:
   retrieving the stored binary image data; and
   performing, with a controller,
      converting the binary image data into higher-resolution continuous tone image data;
      determining at least one image enhancement process;
      applying the at least one image enhancement process to the higher-resolution continuous tone image data to produce an enhanced image; and
      determining output format of the enhanced image; and
      outputting the enhanced image.

2. The method of claim 1, wherein the retrieving of the stored binary image data includes retrieving and using stored metadata indicative of image attributes.

3. The method of claim 2, wherein the metadata includes at least one user-selected setting associated with the lower image binary data selected from the group of consisting of: original type, original subtype, background suppression, contrast enhancement, dynamic range adjustment, brightness adjustment, sharpness adjustment, hue adjustment, chroma adjustment, color balance, and saturation adjustment.

4. The method of claim 2 wherein the metadata includes image segmentation data for each pixel in the original image or blocks of pixels from the original image.

5. The method of claim 2 wherein the metadata includes global image characteristics selected from the group consisting of: Text Image, Photograph Image, Mixed Image, and Map Image.

6. The method of claim 1, wherein the determining of the image enhancement process includes at least one selected from the group consisting of a user-selected enhancement process and an automatic enhancement process.

7. The method of claim 1, wherein the at least one image enhancement process includes at least one of the group consisting of: original type, original subtype, background suppression, contrast enhancement, dynamic range adjustment, brightness adjustment, sharpness adjustment, hue adjustment, chroma adjustment, color balance, and saturation adjustment.

8. The method of claim 1, wherein the application of the at least one image enhancement process to the continuous tone image data image includes performing at least one color transform.

9. The method of claim 8, wherein the performing of at least one color transform includes:
   performing reverse color transforms on the continuous tone image data, based on metadata associated with the binary image, to achieve original color space data format;
   applying the image enhancement processes to the original color space data format; and
   converting the enhanced original color space data back into the continuous tone image data.

10. The method of claim 9, wherein the determination of the output format of the enhanced image data further includes converting the enhanced continuous tone image data back into the binary image data format.

11. The method of claim 1, wherein the outputting of the enhanced image includes supplying the enhanced image to an image output terminal.

12. An apparatus capable of enhancing stored binary image data, comprising:
an image processing system module configured to perform image data conversions and enhancements;
a memory module configured to store at least binary image data;
an image output terminal module configured to output an image; and
a controller module configured to:
initiate retrieval of the stored binary image data from the memory module;
convert the binary image data into higher resolution continuous tone image data for use by the image processing system;
determine at least one image enhancement process;
direct the image processing system to apply the at least one image enhancement process to the higher resolution continuous tone image data to produce an enhanced image;
determine output format of the enhanced image; and
output the enhanced image.

13. The apparatus of claim 12, wherein the controller module is further configured to initiate retrieval of stored metadata associated with the binary image data.

14. The apparatus of claim 12, wherein the at least one image enhancement process determined by the controller module comprises at least one of the group consisting of user-selected enhancement processes and automatic enhancement processes.

15. The apparatus of claim 12, wherein the at least one image enhancement process performed by the image processing system includes at least one of the group consisting of original type, original subtype, background suppression, contrast enhancement, dynamic range adjustment, brightness adjustment, sharpness adjustment hue adjustment, chroma adjustment, color balance, and saturation adjustment.

16. The apparatus of claim 12, a wherein the image processing system is configured to perform the at least one image enhancement process on the continuous tone image data by performing at least one color transform.

17. An apparatus capable of enhancing stored binary image data, comprising:
an image processing system module configured to perform image data conversions and enhancements;
a memory module configured to store at least binary image data;
an image output terminal module configured to output an image; and
a controller module configured to:
initiate retrieval of the stored binary image data from the memory module;
convert the binary image data into higher resolution continuous tone image data for use by the image processing system;
determine at least one image enhancement process;
direct the image processing system to apply the at least one image enhancement process to the higher resolution continuous tone image data to produce an enhanced image;
determine output format of the enhanced image; and
output the enhanced image,
wherein the image processing system is configured to perform the at least one image enhancement process on the continuous tone image data by performing at least one color transform and further includes:
performing reverse color transforms on the continuous tone image data, based on metadata associated with the binary image data, to achieve original color space data format;
applying the image enhancement processes to the original color space data format; and
converting the enhanced original color space data back into the continuous tone image data.

18. The apparatus of claim 17, wherein the determination of the output format of the enhanced image data by the controller module further includes directing the image processing system to convert the enhanced continuous tone image data back into the binary image data format.

* * * * *